US012709154B2

(12) United States Patent
Medeiros et al.

(10) Patent No.: US 12,709,154 B2
(45) Date of Patent: Aug. 18, 2026

(54) INTERCHANGABLE WHEEL HUB MODULES

(71) Applicant: Warn Automotive, LLC, Milwaukie, OR (US)

(72) Inventors: John Medeiros, Portland, OR (US); Michael Church, Milwaukie, OR (US); Adam Reiner, Wilsonville, OR (US); Russell Conine, Portland, OR (US)

(73) Assignee: WARN Automotive, LLC, Milwaukie, OR (US)

(*) Notice: Subject to any disclaimer, the term of this patent is extended or adjusted under 35 U.S.C. 154(b) by 673 days.

(21) Appl. No.: 18/167,606

(22) Filed: Feb. 10, 2023

(65) Prior Publication Data

US 2023/0256818 A1 Aug. 17, 2023

Related U.S. Application Data

(60) Provisional application No. 63/309,388, filed on Feb. 11, 2022.

(51) Int. Cl.

| | |
|---|---|
| ***B60K 23/08*** | (2006.01) |
| ***B60B 27/00*** | (2006.01) |
| ***F16D 1/10*** | (2006.01) |
| ***F16D 11/00*** | (2006.01) |
| ***F16D 11/14*** | (2006.01) |
| ***F16D 23/12*** | (2006.01) |
| ***F16D 25/061*** | (2006.01) |

(52) U.S. Cl.

CPC .......... *B60K 23/08* (2013.01); *B60B 27/0026* (2013.01); *F16D 1/10* (2013.01); *F16D 11/14* (2013.01); *F16D 23/12* (2013.01); *F16D 25/061* (2013.01); *F16D 2001/103* (2013.01); *F16D 2011/004* (2013.01); *F16D 2023/123* (2013.01)

(58) Field of Classification Search

CPC ........ F16D 1/06; F16D 2001/062; F16D 1/10; F16D 2001/103; F16D 2011/004; F16D 11/14; F16D 23/12; F16D 2023/123; F16D 25/061; F16D 2250/0084; B60B 27/0015; B60B 27/0021; B60B 27/0026; B60B 7/066; B60B 7/12; B60K 17/3515; B60K 23/08

USPC .............................................. 192/69.4–69.43

See application file for complete search history.

(56) References Cited

U.S. PATENT DOCUMENTS

| | | | | |
|---|---|---|---|---|
| 1,338,720 | A | 5/1920 | Darr | |
| 2,715,217 | A | 8/1955 | Russell | |
| 5,141,088 | A * | 8/1992 | Kurihara | F16D 25/061 192/85.11 |
| 6,082,514 | A | 7/2000 | Averill | |
| 6,942,082 | B1 | 9/2005 | Bunnow et al. | |
| 7,048,668 | B2 | 5/2006 | Busch et al. | |

(Continued)

FOREIGN PATENT DOCUMENTS

EP 2816255 A1 12/2014

*Primary Examiner* — Richard M Lorence

(74) *Attorney, Agent, or Firm* — Fish & Richardson P.C.

(57) ABSTRACT

A drive spline defines an inner profile configured to receive and mate with a drive axle and an outer profile configured to mate with a wheel hub. A cage surrounds and is engaged with the outer profile of the drive spline. The cage retains the drive spline axially and radially in position relative to the outer profile. A cap is coupled to an end of the wheel hub connecting device opposite the drive spline. The cap encloses the end of the hub connecting device.

11 Claims, 12 Drawing Sheets

(56) References Cited

U.S. PATENT DOCUMENTS

| | | | | |
|---|---|---|---|---|
| 8,382,633 | B2 | 2/2013 | Cooper et al. | |
| 9,382,951 | B2 * | 7/2016 | Reiner | B60K 17/3515 |
| 9,383,008 | B2 | 7/2016 | Anderson et al. | |
| 9,518,623 | B2 | 12/2016 | Mastie et al. | |
| 9,784,321 | B2 | 10/2017 | Pritchard | |
| 9,845,834 | B2 | 12/2017 | Kohlbock et al. | |
| 10,648,517 | B2 | 5/2020 | Mastie et al. | |
| 11,168,743 | B2 | 11/2021 | Smith et al. | |
| 11,312,234 | B1 * | 4/2022 | Haggard | B60K 17/16 |
| 2006/0037831 | A1 | 2/2006 | Grillo et al. | |
| 2007/0135260 | A1 | 6/2007 | Bianchi | |
| 2010/0276245 | A1 | 11/2010 | Umeno et al. | |
| 2013/0075224 | A1 | 3/2013 | Hirsch et al. | |
| 2018/0372171 | A1 * | 12/2018 | Boudreau | F16D 28/00 |
| 2021/0071759 | A1 | 3/2021 | Carmean et al. | |
| 2022/0381340 | A1 | 12/2022 | Pellmann et al. | |

* cited by examiner

702

Inserting a first module into the first wheel hub

704a inserting a second module into the second wheel hub, the second module being different from the first module 704b inserting a second module into the second wheel hub, the second module being identical to first module

INTERCHANGABLE WHEEL HUB MODULES

CROSS-REFERENCE TO RELATED APPLICATIONS

This application claims priority under 35 U.S.C. § 119 to U.S. Application No. 63/309,388, filed on Feb. 11, 2022, the contents of which is hereby incorporated by reference.

TECHNICAL FIELD

This disclosure relates to wheel hub modules that can actuate or remain fixed.

BACKGROUND

Some vehicles employ four-wheel drive systems to increase traction for off-road driving as well as low traction for on-road driving. However, it may be desirable to provide optional engagement/disengagement of the four-wheel drive system to increase the versatility of the vehicle. Specifically, two of the drive wheels may be disengaged to provide two-wheel drive during on-road driving to increase the vehicle's fuel economy. On the other hand, four-wheel drive may be used to provide increased traction during certain driving conditions, such as vehicle operation on dirt roads, snow, etc. In this way, a user may adjust a vehicle's drivetrain based on the driving circumstances and the desired vehicle performance characteristics.

Engagement of four-wheel drive systems may be automatically activated or manually activated. Although automatic four-wheel drive engagement has a number of benefits, such as decreased user interaction, automatic engagement four-wheel drive systems also may have some drawbacks, such as greater manufacturing costs as well as repair and maintenance costs. On the other hand, manually engaged four-wheel drive systems have certain benefits over automatically engaged system, such as increased reliability and decreased manufacturing and repair costs. Therefore, manual four-wheel drive systems may be desired by users who prefer less complex and more reliable four-wheel drive systems, such as off-road enthusiasts.

However, many manual locking hub systems do not achieve an adequate amount of reliability and may break, necessitating repair. For instance, certain manual locking hub systems employ plastic components which are not durable and can break during off-road use, installation, and/or removal. Additionally, some systems employ a floating bearing housing which allows for movement and wear. Furthermore, it may be difficult to disassemble the manual locking hubs without the use of specialized tools due to the design of the hub lock, necessitating full replacement of the hub lock as opposed to replacement of only the broken parts in the hub lock.

SUMMARY

This specification describes technologies relating to interchangeable wheel hub modules.

An example of the subject matter described within this disclosure is a wheel hub connecting device with the following features. A drive spline defines an inner profile configured to receive and mate with a drive axle and an outer profile configured to mate with a wheel hub. A cage surrounds and is engaged with the outer profile of the drive spline. The cage retains the drive spline axially and radially in position relative to the outer profile. A cap is coupled to an end of the wheel hub connecting device opposite the drive spline. The cap encloses the end of the hub connecting device.

Aspects of the example wheel hub connecting device, which can be combined with the example wheel hub connecting device alone or in combination with other aspects, include the following. The cap includes a ring configured to attach to the wheel hub. A removable cover is surrounded by the ring. A gasket is between the ring and the removable cover. The removable cover is retained to the ring by friction of the gasket.

Aspects of the wheel hub connecting device, which can be combined with the wheel hub connecting device alone or in combination with other aspects, include the following. The cage includes collets extending axially away from the drive spline, the collets retaining the ring.

An example of the subject matter described within this disclosure is a method with the following features. A vehicle is driven by an axle. A first wheel is coupled to a first end of the axle, and a second wheel is coupled to a second end of the axle. The first wheel is coupled to the axle to rotate in unison with the axle by a hub connecting device. The second wheel is engaged to be rotably coupled to the second end of the axle by a hub lock. Engaging by the hub lock includes axially translating a spline clutch to mate with a drive spline.

Aspects of the example method, which can be combined with the example method alone or in combination with other aspects, include the following. Engaging the second wheel includes rotating a cap of the hub lock. The cap includes an interaction side defining a surface to be manipulated by an operator, and an operation side defining a ramped portion arranged to axially move the spline clutch responsive to a rotational position of the cap.

Aspects of the example method, which can be combined with the example method alone or in combination with other aspects, include the following. Engaging the second wheel includes receiving a pneumatic signal by the hub lock, and axially translating the spline clutch to engage with the drive spline by a diaphragm responsive to received pneumatic signal.

Aspects of the example method, which can be combined with the example method alone or in combination with other aspects, include the following. The second wheel is disengaged by the hub lock.

Aspects of the example method, which can be combined with the example method alone or in combination with other aspects, include the following. Disengaging the second wheel includes receiving a pneumatic signal by the hub lock. The spline clutch is axially translated to disengage the drive spline by a diaphragm responsive to received pneumatic signal.

Aspects of the example method, which can be combined with the example method alone or in combination with other aspects, include the following. Disengaging the second wheel includes rotating a cap of the hub lock. The cap includes an interaction side defining a surface to be manipulated by an operator, and an operation side defining a ramped portion arranged to axially move the spline clutch responsive to a rotational position of the cap.

Aspects of the example method, which can be combined with the example method alone or in combination with other aspects, include the following. Disengaging the second wheel includes rotating a cap of the hub lock. The axle is a first axle, the hub lock is a first hub lock, the spline clutch is a first spline clutch, and the drive spline is a first drive spline. The vehicle is driven by a second axle. A third wheel is coupled to a first end of the second axle, and a fourth wheel is coupled to a second end of the second axle. The third wheel is rotably coupled to second end of the second axle. The third wheel is on a side of the vehicle opposite the first wheel. The fourth wheel is engaged to be rotably coupled to the second end of the second axle by a second hub lock. Engaging the hub lock includes axially translating a second spline clutch to mate with a second drive spline.

Aspects of the example method, which can be combined with the example method alone or in combination with other aspects, include the following. Engaging the fourth wheel includes rotating a cap of the second hub lock. The cap of the second hub includes an interaction side defining a surface to be manipulated by an operator, and an operation side defining a ramped portion arranged to axially move the spline clutch responsive to a rotational position of the cap.

Aspects of the example method, which can be combined with the example method alone or in combination with other aspects, include the following. Engaging the fourth wheel includes receiving a pneumatic signal by the hub lock, and axially translating the second spline clutch to mate with the second drive spline by a diaphragm responsive to received pneumatic signal.

Aspects of the example method, which can be combined with the example method alone or in combination with other aspects, include the following. The fourth wheel is disengaged by the hub lock.

Aspects of the example method, which can be combined with the example method alone or in combination with other aspects, include the following. Disengaging the fourth wheel includes receiving a pneumatic signal by the hub lock, and axially translating the second spline clutch to un-mate with the drive spline by a diaphragm responsive to received pneumatic signal.

Aspects of the example method, which can be combined with the example method alone or in combination with other aspects, include the following. Disengaging the fourth wheel includes rotating a cap of the second hub lock. The cap includes an interaction side defining a surface to be manipulated by an operator, and an operation side defining a ramped portion arranged to axially move the spline clutch responsive to a rotational position of the cap.

Aspects of the example method, which can be combined with the example method alone or in combination with other aspects, include the following. The first wheel and the second wheel are simultaneously engaged.

An example implementation of the subject matter described within this disclosure is an axle system with the following features. A wheel hub connecting device is at a first end of a drive axle. The wheel hub connecting device includes a drive spline defining an inner profile configured to receive and mate with a drive axle and an outer profile configured to mate with a wheel hub. A cage surrounds and engages with the outer profile of the drive spline. The cage retains the drive spline axially and radially. A cap is at an end of the wheel hub connecting device opposite the drive spline. The cap is configured to prevent dust from entering the wheel hub connecting device. A hub lock has substantially similar outer dimensions as the wheel hub connecting device. The hub lock is at a second end of the drive axle. The hub lock includes a drive spline defining an inner profile configured to receive and mate with a drive axle and an outer profile. An axially adjustable spline clutch defines an inner profile configured to mate with the outer profile of the drive spline. A cage engages with both the spline clutch and the drive spline to keep the spline clutch and drive spline rotably aligned. A cap defines an interaction side defining a surface to be manipulated by an operator, and an operation side defining a ramped portion arranged to axially move the spline clutch responsive to a rotational position of the cap. A diaphragm is between the cap and the spline clutch.

Aspects of the example axle system, which can be combined with the example axle system alone or in combination with other aspects, include the following. The hub lock further includes a bias set to maintain the spline clutch in a disengaged position.

Aspects of the example axle system, which can be combined with the example axle system alone or in combination with other aspects, include the following. A pneumatic linkage fluidically connects the diaphragm to an actuable pressure source or actuable vacuum source.

Aspects of the example axle system, which can be combined with the example axle system alone or in combination with other aspects, include the following. A controller is configured to direct the actuable pressure source or actuable vacuum source to send an engagement signal to the hub lock.

Aspects of the example axle system, which can be combined with the example axle system alone or in combination with other aspects, include the following. A controller is configured to direct the actuable pressure source or actuable vacuum source to send a disengagement signal to the hub lock.

An example of the subject matter disclosed within this disclosure is a method with the following features. An axle system include a drive axle having a first wheel hub at a first end of the axle and a second wheel hub at a second end of the axle. The first wheel hub and the second wheel hub each define identical profiles configured to receive a module. The module includes a hub connecting device configured to engage a wheel hub with the drive axle, or a hub lock configured to actuably engage and disengage a wheel hub to the drive axle. The method includes inserting a first module into the first wheel hub.

Aspects of the example method, which can be combined with the example method alone or in combination with other aspects, include the following. A second module is inserted into the second wheel hub, the second module being different from the first module.

Aspects of the example method, which can be combined with the example method alone or in combination with other aspects, include the following. A second module is inserted into the second wheel hub. The second module is identical to first module.

Aspects of the example method, which can be combined with the example method alone or in combination with other aspects, include the following. The first module includes the hub connecting device.

An example of the subject matter described within this disclosure is a wheel hub connecting device with the following features. A drive spline defining an inner profile configured to receive and mate with a drive axle and an outer profile configured to mate with a wheel hub. A cap coupled to an end of the wheel hub connecting device opposite the drive spline. A spring coupling the cap to the drive spline and retaining the drive spline axially and radially in position relative to the outer profile.

Aspects of the example method, which can be combined with the example method alone or in combination with other aspects, include the following. The spring is the only structural member connecting the cap to the drive spline.

Aspects of the example method, which can be combined with the example method alone or in combination with other aspects, include the following. A first end of the spring is wound at least partially around an annular groove in the drives spline and a second end of the spring is at least partially wound around an annular groove in the cap.

Aspects of the example method, which can be combined with the example method alone or in combination with other aspects, include the following. The cap includes a ring configured to attach to the wheel hub, a removable cover surrounded by the ring, and a gasket between the ring and the removable cover, the removable cover retained to the ring by friction of the gasket.

Aspects of the example method, which can be combined with the example method alone or in combination with other aspects, include the following. A first end of the spring is wound at least partially around an annular groove in the drives spline and a second end of the spring is at least partially wound around an annular groove in the ring.

Aspects of the example method, which can be combined with the example method alone or in combination with other aspects, include the following. The spring is configured to provide a pre-load centering force when installed within a wheel hub.

Particular embodiments of the subject matter described in this specification can be implemented so as to realize one or more of the following advantages. The hub connecting device described herein can provide reliable engagement at reduced cost compared to a full set of hub lock systems. The modular aspect of the devices described herein allow for ease of manufacturing and improved upgradeability.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

While actuable, locking hubs have numerous advantages, having four actuable hubs on a four-wheel drive vehicle can be costly and unnecessary for many consumers. This disclosure describes a modular wheel hub connecting device that is fixed, meaning that the wheel hub is always locked to rotate in unison with the drive axle. The modular wheel hub device has a substantially identical (within manufacturing tolerances) outer profile to a modular, actuable hub lock such that the two modules can be interchanged with little to no modifications during manufacturing. Similarly, the modules can be swapped out by an end user if so desired.

Figure 1:
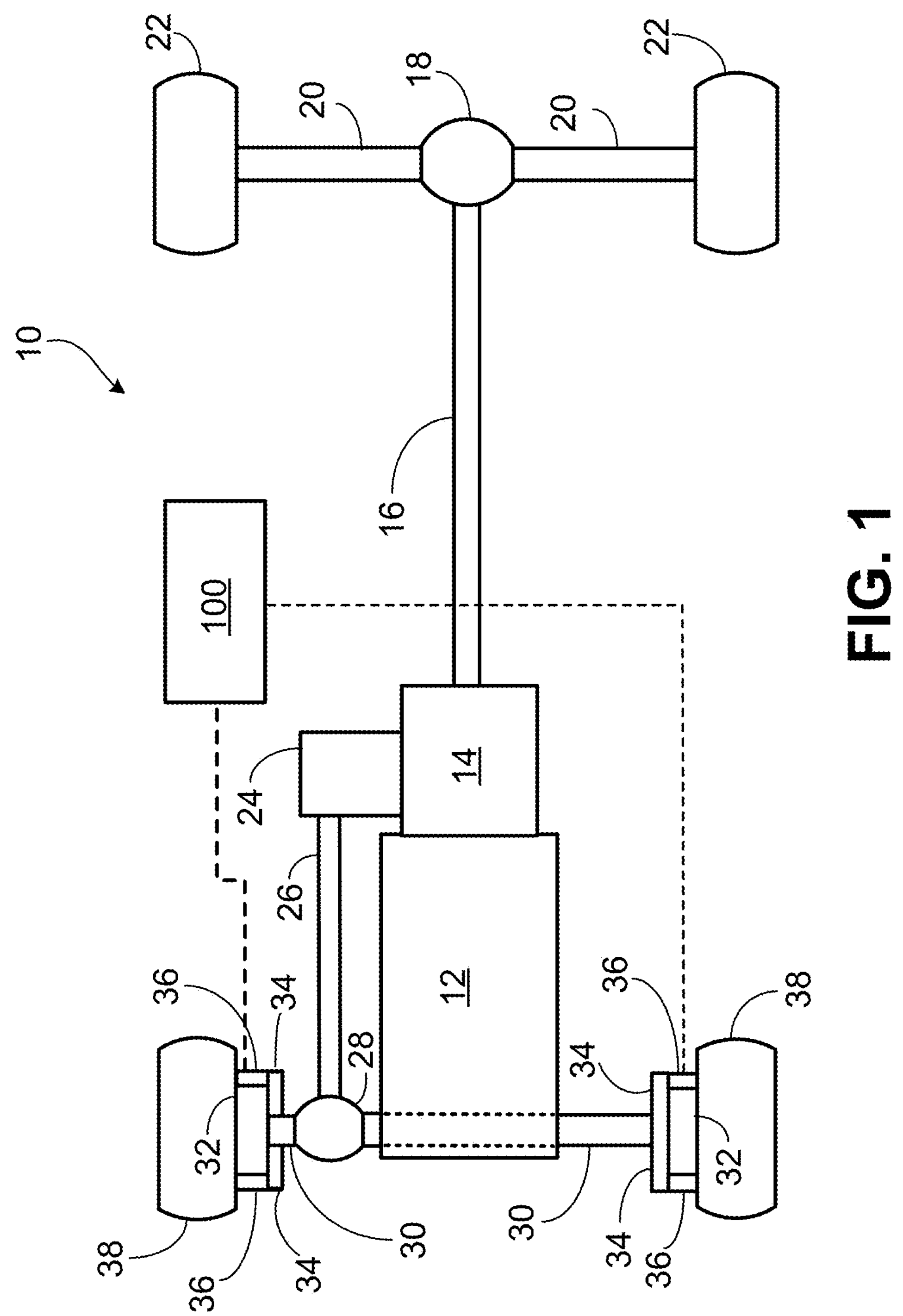
FIG. 1 is a schematic view of a vehicle with an axle system that can be used with aspects of this disclosure.

FIG. 1 is a schematic view of a four-wheel drive vehicle 10 using an axle system that can be used with aspects of this disclosure. The vehicle 10 includes an internal combustion engine 12 configured to perform combustion cycles and generate a rotation output. The vehicle 10 further includes a transmission 14 coupled to the engine 12. The transmission is configured to receive the rotational output from the engine 12. The vehicle 10 further includes a propeller shaft 16 coupled to the transmission and receiving rotational input therefrom. The propeller shaft 16 rotates a differential 18. In turn the differential 18 rotates axles 20 coupled to a set of wheels 22 (e.g., rear wheels). Therefore, the propeller shaft 16 is coupled to the differential 18 and the differential 18 is coupled to the axles 20. The set of wheels 22 may be referred to as drive wheels.

The vehicle 10 further includes a transfer case 24 coupled to the transmission 14 and configured to receive rotational output therefrom. The transfer case 24 rotates a second propeller shaft 26. The second propeller shaft 26 is coupled to a second differential 28 coupled to the axles 30 and transfer rotational input thereto. Each of the axles 30 are coupled to locking hub systems 32. Each of the locking hub systems 32 are rotationally coupled to the axles 30. The locking hub systems 32 are coupled to wheel bearings 34 and wheel attachment interfaces 36. The vehicle 10 further includes wheels 38 coupled to the wheel attachment interfaces 36. The wheel bearings 34, wheel attachment interfaces 36, and wheels 38 may be included in a wheel assembly.

The locking hub systems 32 are constructed to enable the wheels 38 to freely rotate in a disengaged configuration and constructed to enable rotational force to be transferred from the axles 30 to the wheels 38 in an engaged configuration. In this way, a second set of wheels may be enabled and disabled as drive wheels, providing optional two-wheel drive and four-wheel drive configurations in the vehicle 10. It will be appreciated that the locking hub systems 32 may be manually actuated to reconfigure the systems in the engaged configuration and disengaged configuration. Alternatively or in addition, greater or fewer locking hub systems 32 can be included in the four-wheel drive vehicle 10. While primarily described as being used with a four-wheel drive vehicle, the locking hub systems 32 can be used with other drive arrangements as well, such as a two-wheel drive vehicle or a six-wheel drive vehicle. In some implementations, the locking hub systems 32 can be coupled to a controller 100. The controller 100 is configured to actuate the locking hub systems 32.

In some implementations, a single actuable locking hub system 32 is included on an axle. In such implementations, a single locking hub system, or hub lock, is at a first end of the axles 30 while a wheel hub connecting device is at a second end of the axles 30.

Figure 2:
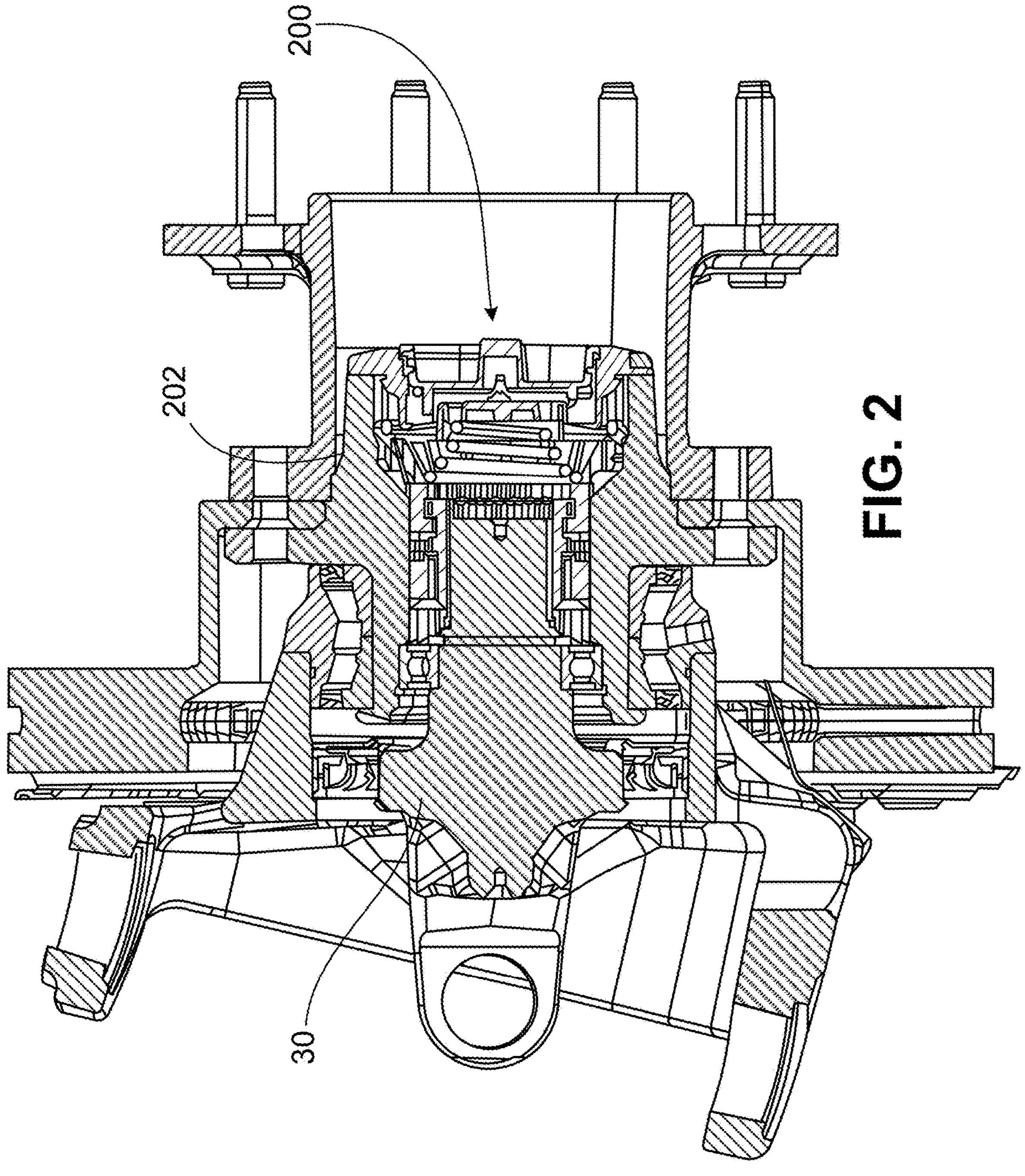
FIG. 2 is a side cross-sectional view of an example hub lock within a wheel hub.
Figure 3:
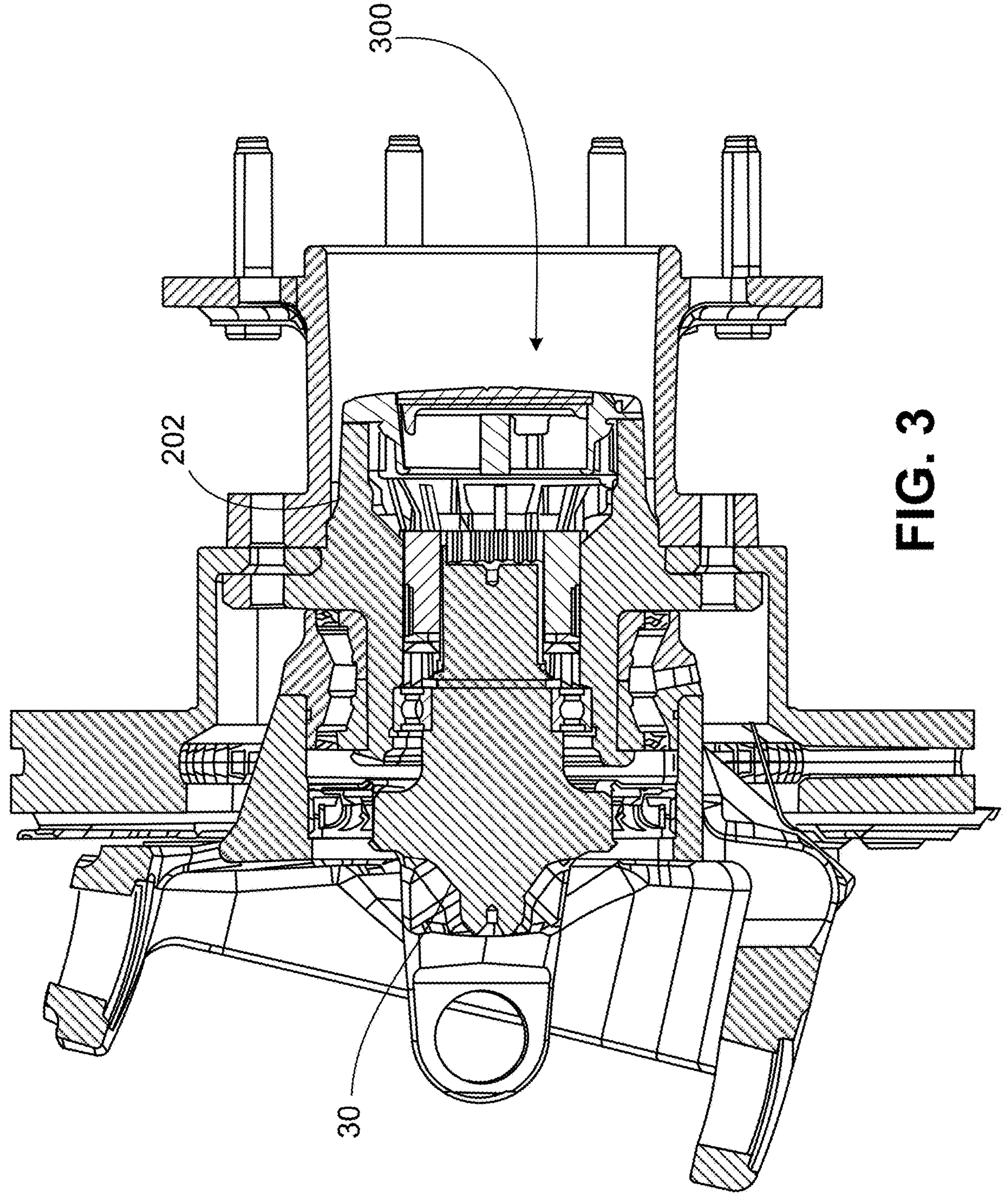
FIG. 3 is a side cross-sectional view of an example wheel hub connecting device within a wheel hub.

FIG. 2 is a side cross-sectional view of an example hub lock 200 within a wheel hub 202. The example hub lock 200 can act as the locking hub system 32 previously described. The wheel hub 202 is the component that the wheel 38 attaches to. The wheel hub 202 is configured to rotate in unison with the wheel 38. FIG. 3 is a side cross-sectional view of an example wheel hub connecting device 300 within a wheel hub 202. The wheel hub lock 200 and the wheel hub connecting device 300 have substantially identical exterior profiles (within typical manufacturing tolerances) such that the wheel hub lock 200 and the wheel hub connecting device 300 can be exchanged within the same wheel hub. That is, the wheel hub lock 200 and the wheel hub connecting device 300 are housed within substantially similar, interchangeable modules. As a result, an end user can swap out an actuable wheel hub lock 200 for a fixed wheel hub connecting device 300, or vice versa.

As previously described, the wheel hub lock 200 is actuable and can engage (lock) the wheel hub 202 to the axle 30 or disengage (unlock), or rotably uncouple the wheel hub 202 from the axle 30. The wheel hub connecting device 300 is fixed such that the wheel hub connecting device constantly engages, or locks, the wheel hub 202 to the axle 30.

Figure 4:
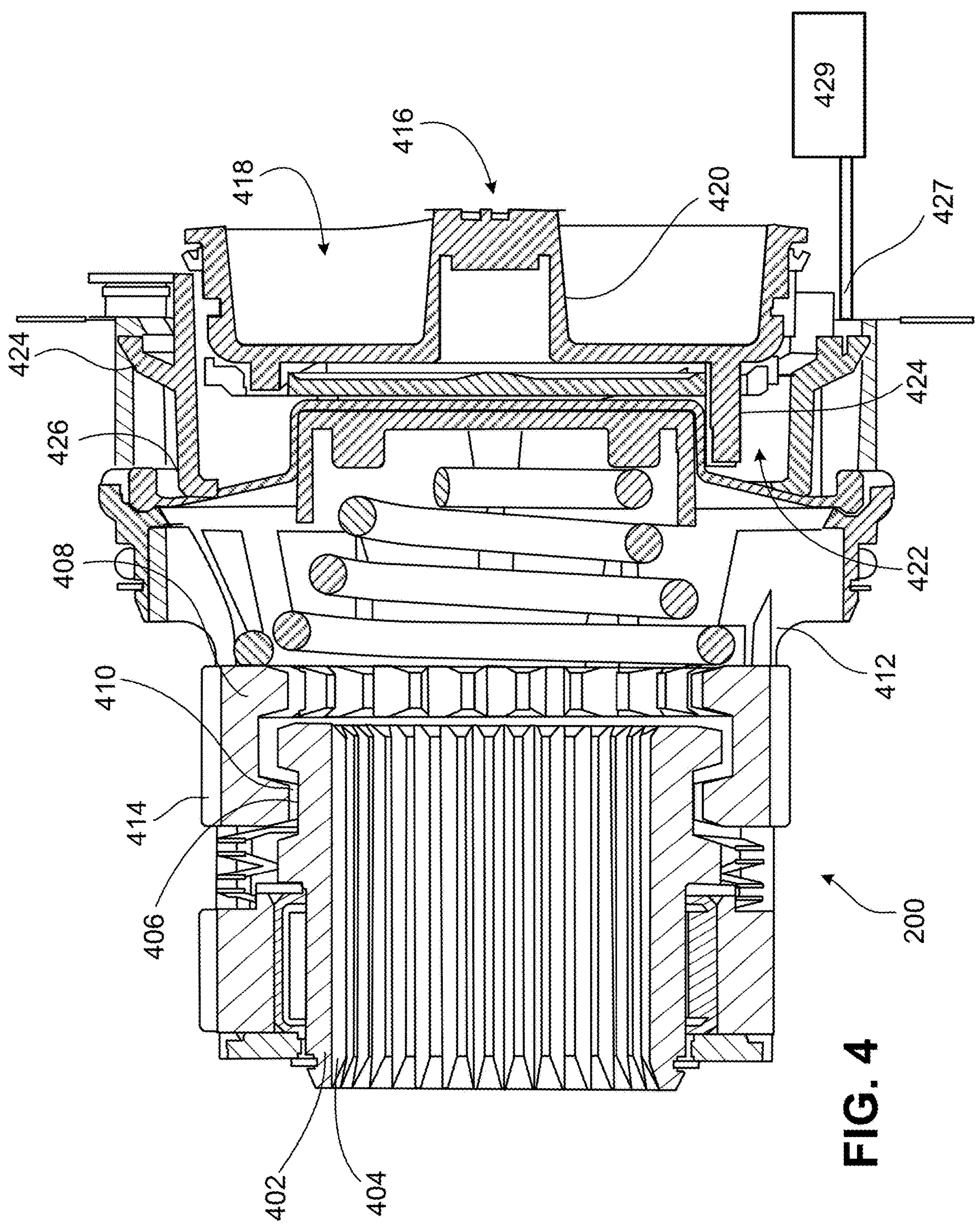
FIG. 4 is a side cross-sectional view of an example hub lock.

FIG. 4 is a side cross-sectional view of an example hub lock 200. The hub lock 200 includes a drive spline 402 defining an inner profile 404 configured to receive and mate with a drive axle 30 and an outer profile 406. An axially adjustable spline clutch 408 defines an inner profile 410 configured to mate with the outer profile 406 of the drive spline 402. A cage 412 is engaged with both the spline clutch 408 and the drive spline 402 to keep the spline clutch 408 and drive spline 402 rotably aligned. That is, longitudinal portions of the cage 412 engage with the outer profile 406 of the drive spline 402 and an outer profile 414 of the spline clutch 408 by creating an interference that prevents relative rotation between the drive spline 402 and the spline clutch 408.

A cap 416 defines an interaction side 418. The interaction side 418 defines a surface 420 to be manipulated by an operator. That is, the surface 420 includes a profile that allows a user or tool to rotate or otherwise adjust the cap 416. The cap 416 also includes an operation side 422 that is rotably coupled to rotate in unison with the interaction side 418. The operation side 422 defines a ramped portion 424 arranged to axially move the spline clutch 408 responsive to a rotational position of the cap 416. A diaphragm 426 is between the cap 416 and the spline clutch 408. The diaphragm 426 at least partially defines an air-tight chamber that can change in size based on pressure changes or the ramped portion 424. In some implementations, the hub lock 200 includes a bias, such as a spring, set to maintain the spline clutch 408 in a disengaged position (as shown in FIG. 4).

In some implementations, a pneumatic linkage 427 fluidically connects the diaphragm 426 to an actuable pressure source or actuable vacuum source 429. In such an implementation, a controller 100 (FIG. 1) can direct the actuable pressure source or actuable vacuum source 429 to send an engagement signal or a disengagement signal to the hub lock 200. Such a signal adjusts the pressure in the chamber, and causes the diaphragm 426 to move responsive to the pressure change. Such an arrangement can allow a user to engage or disengage the hub lock 200 from within a cabin of a vehicle equipped with the hub lock 200. Alternatively or in addition, as previously described, the user can rotate that cap to engage or disengage the hub lock 200.

Figure 5:
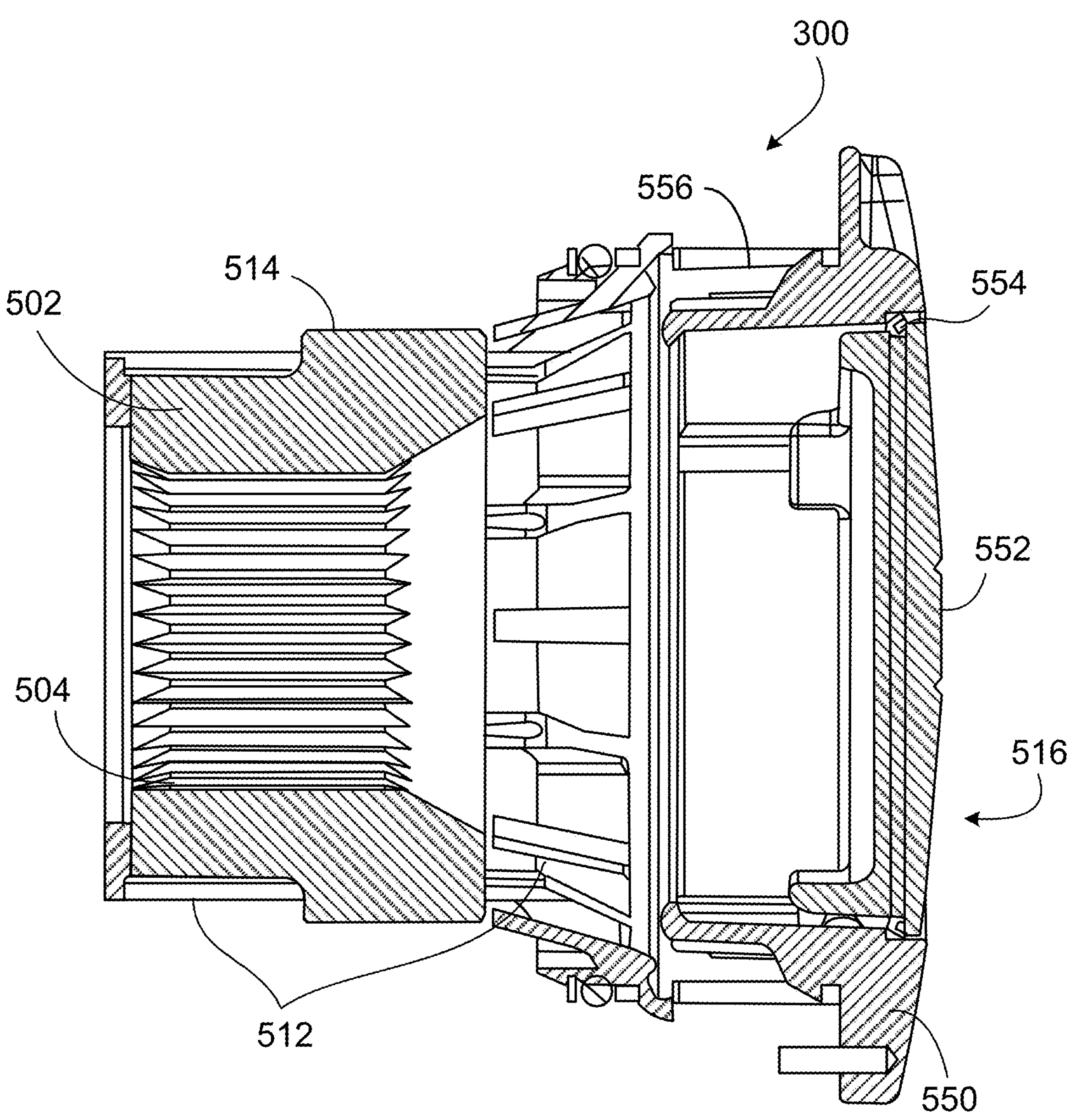
FIG. 5 is a side cross-sectional view of a first example hub wheel connecting device.

FIG. 5 is a side cross-sectional view of an example wheel hub connecting device 300. The wheel connecting device includes a drive spline 502 defining an inner profile 504 configured to receive and mate with a drive axle 30 (FIG. 2) and an outer profile 514 configured to mate with a wheel hub 202 (FIG. 3). A cage 512 surrounds and engages with the outer profile 514 of the drive spline 502. The cage 512 retains the drive spline 502 axially and radially. A cap 516 is located at an end of the wheel hub connecting device 300 opposite the drive spline 502. The cap 516 is configured to prevent dust from entering the wheel hub connecting device 300.

The cap 516 itself includes several components, including a ring 550 configured to attach to the wheel hub 202 (FIG. 3). A removable cover 552 is surrounded by the ring 550. A gasket 554 is between the ring and the removable cover 552. The removable cover 552 is retained to the ring 550 by the friction provided by the gasket 554. The gasket 554 helps prevent dust, liquids, and other contaminants from entering the hub connecting device 300. The ring 550 is retained by collets 556 of the cage 512 that extend axially away from the drive spline 502.

FIGS. 8A-8E show various views of another example wheel hub connecting device 300. The wheel connecting device includes a drive spline 802 defining an inner profile 804 configured to receive and mate with a drive axle 30 (FIG. 2) and an outer profile 814 configured to mate with a wheel hub 202 (FIG. 3). A cap 816 is located at an end of the wheel hub connecting device 300 opposite the drive spline 502. The cap 816 is configured to prevent dust from entering the wheel hub connecting device 300.

The cap 816 itself includes several components, including a ring 850 configured to attach to the wheel hub 202 (FIG. 3). A removable cover 852 is surrounded by the ring 850. A gasket 854 is between the ring and the removable cover 852. The removable cover 852 is retained to the ring 850 by the friction provided by the gasket 854. The gasket 854 helps prevent dust, liquids, and other contaminants from entering the hub connecting device 300.

A spring 812 couples the drive spline 802 to the cap 816. The spring 812 engages with an annular groove 822 of the drive spline 802 and an annular groove 824 of the ring 850. For example, the spring 812 is at least partially wound around the annular groove 822 at one end and at least partially wound around the annular groove 824 at the other end. The spring 812 retains the drive spline 802 axially and radially. The spring 812 is the only structural member connecting the cap 816 to the drive spline 802.

Figure 9:
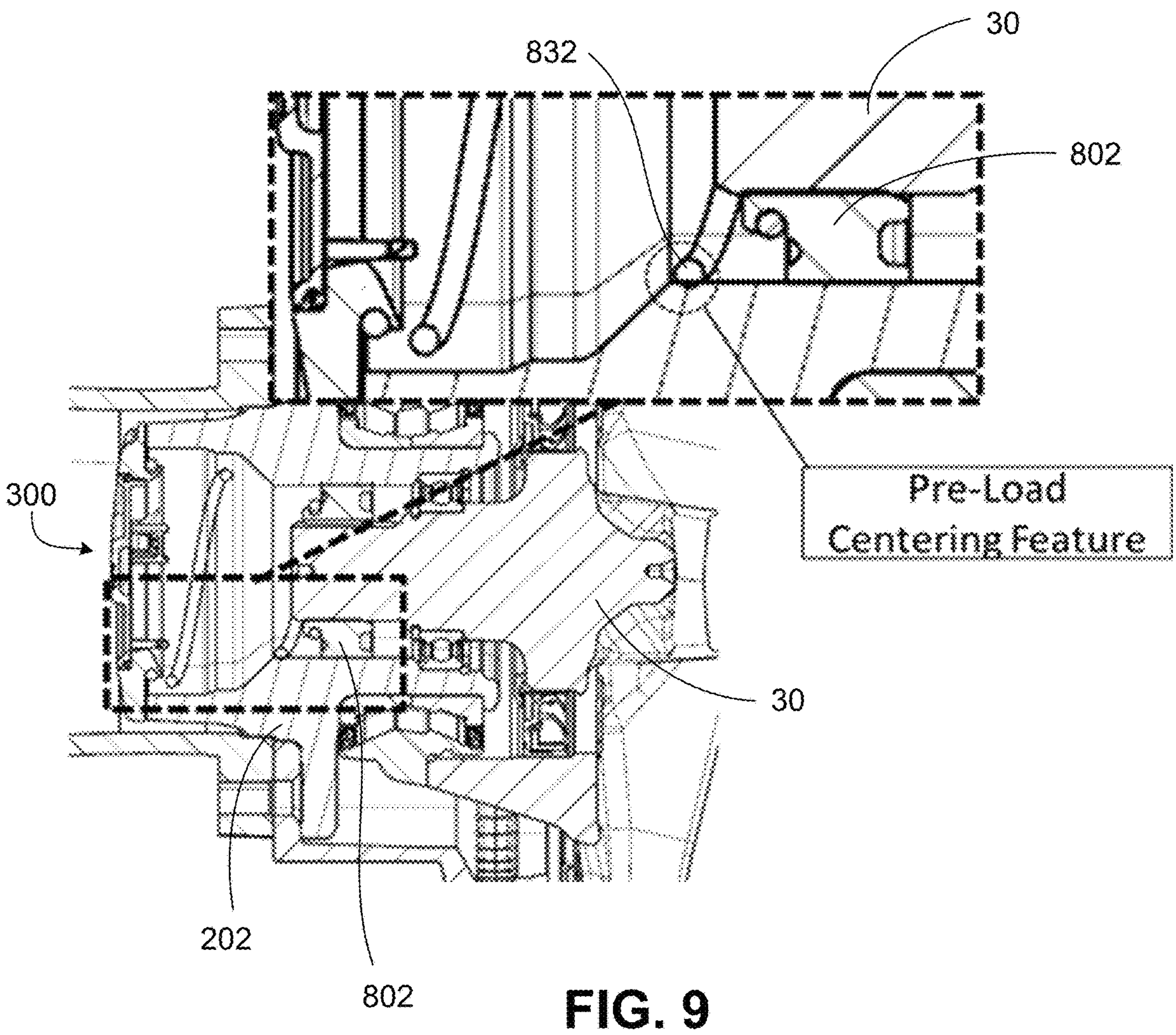
FIG. 9 is a side cross-sectional view of the wheel hub connecting device of FIGS. 8A-8E within a wheel hub.

Referring to FIG. 9, the spring 812 provides a pre-load centering feature for the heel wheel hub connecting device 300. For instance, the taper of the spring's 812 outer profile is such that, when installed, the outer surface of the spring windings 832 engages the inner surface of the hub 202. In some implementations, this engagement creates a pre-load force that centers the drive spline 802 with an axel 30.

Figures 6, 7:
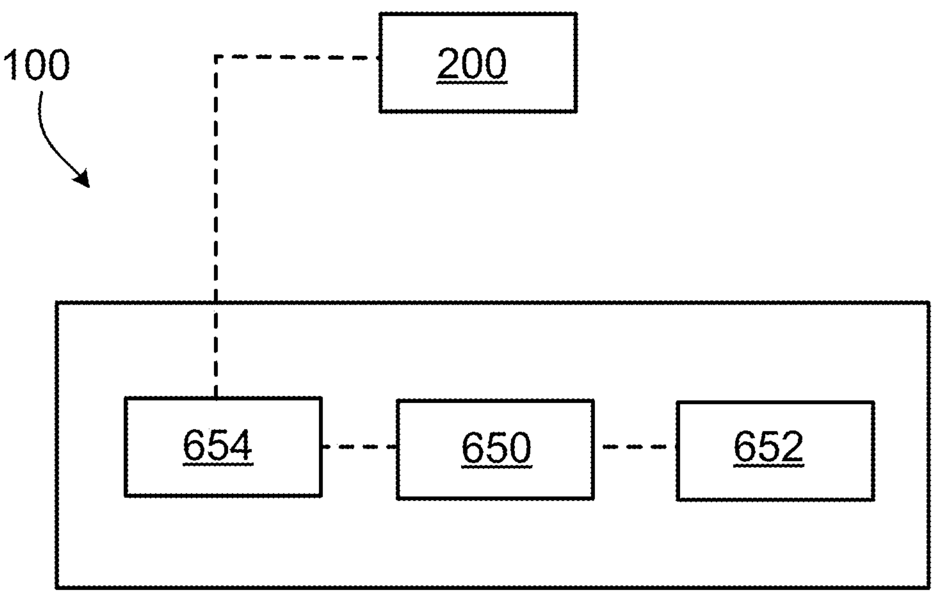
FIG. 6 is a block diagram of a controller that can be used with aspects of this disclosure.
FIG. 7 is a flowchart of an example method that can be used with aspects of this disclosure.
Figure 8A:
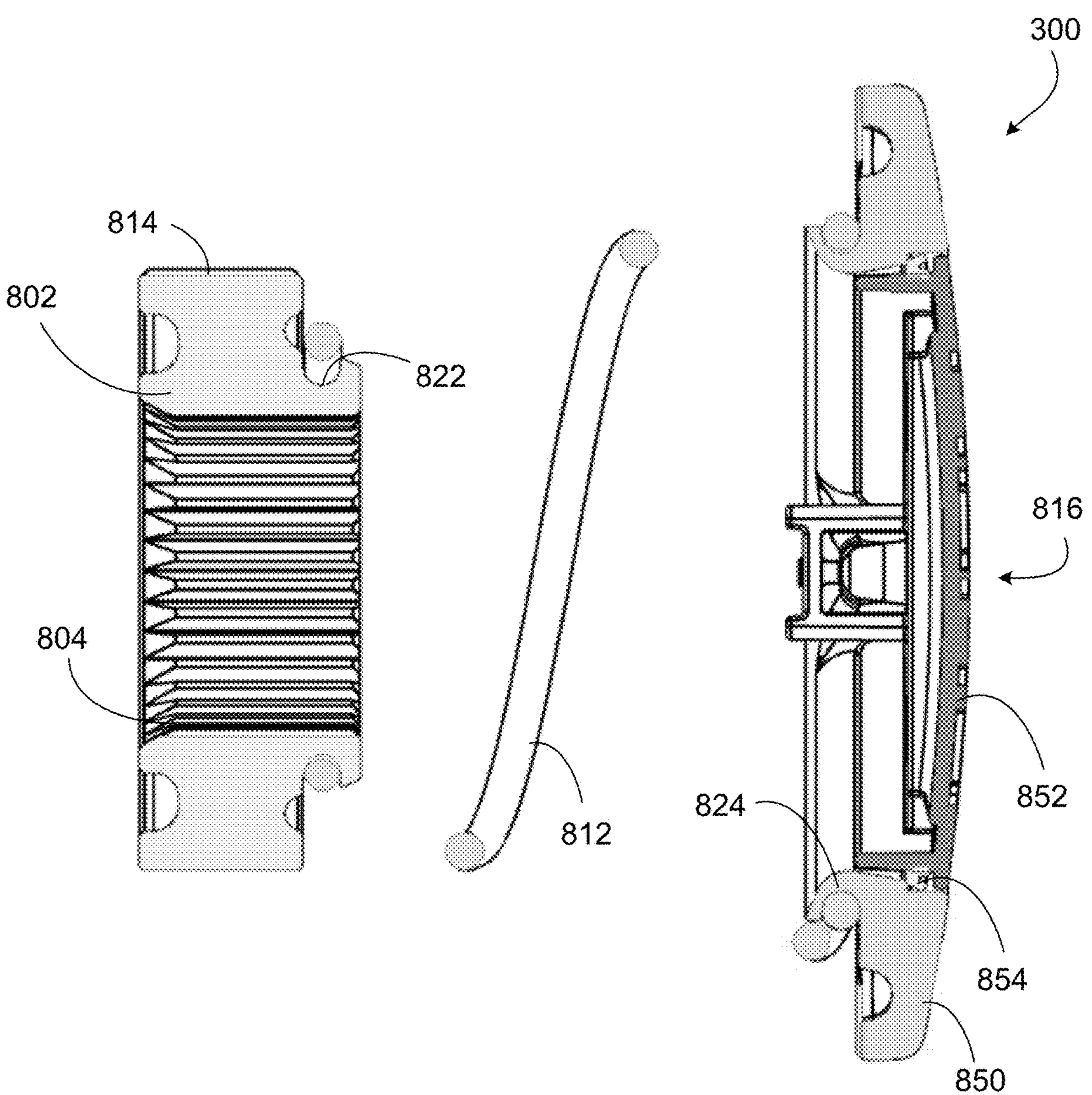
FIG. 8A is a side cross-sectional view of a second example hub wheel connecting device.
Figure 8B:
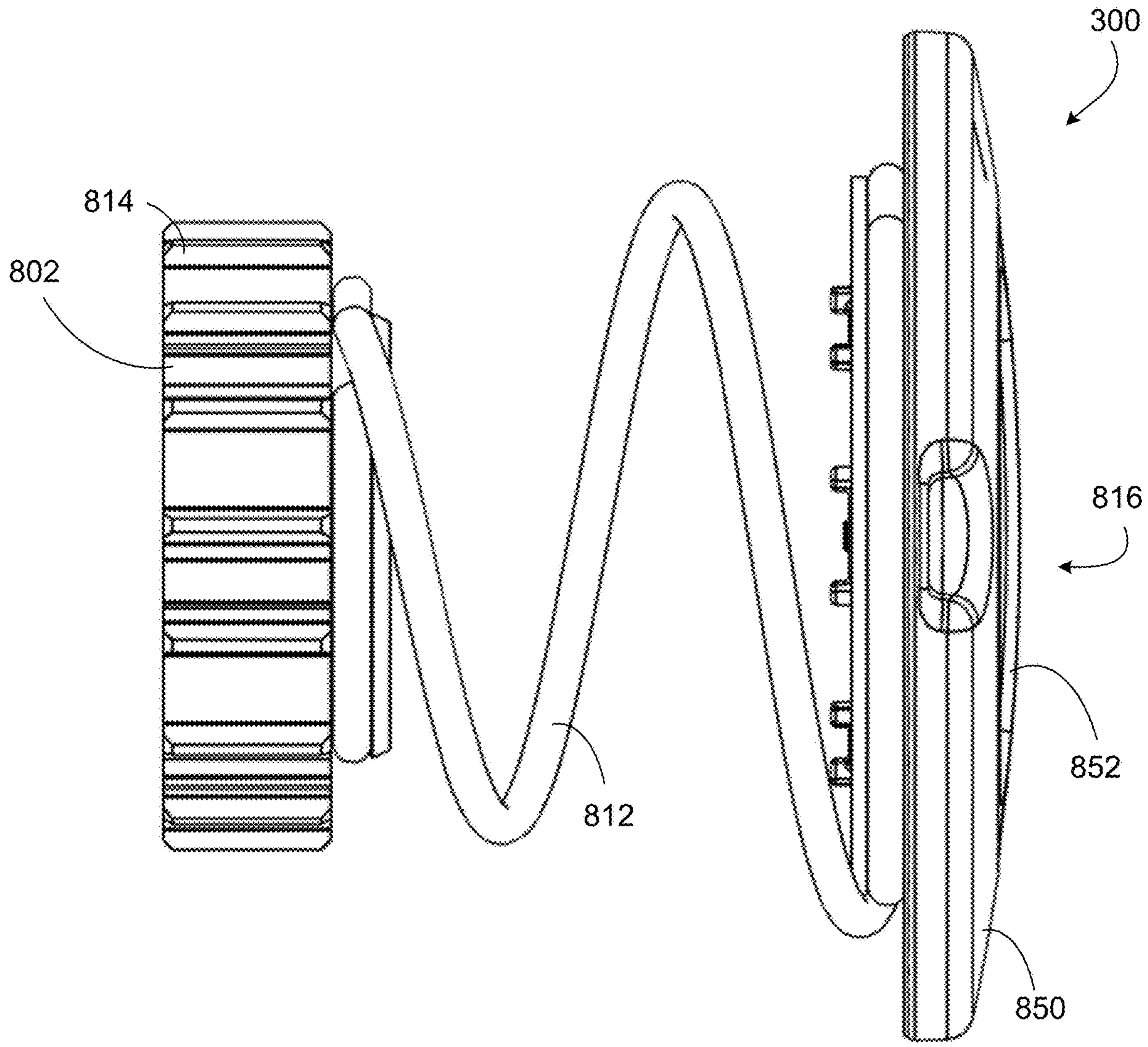
FIG. 8B is a side view of the second example hub wheel connecting device.
Figure 8C:
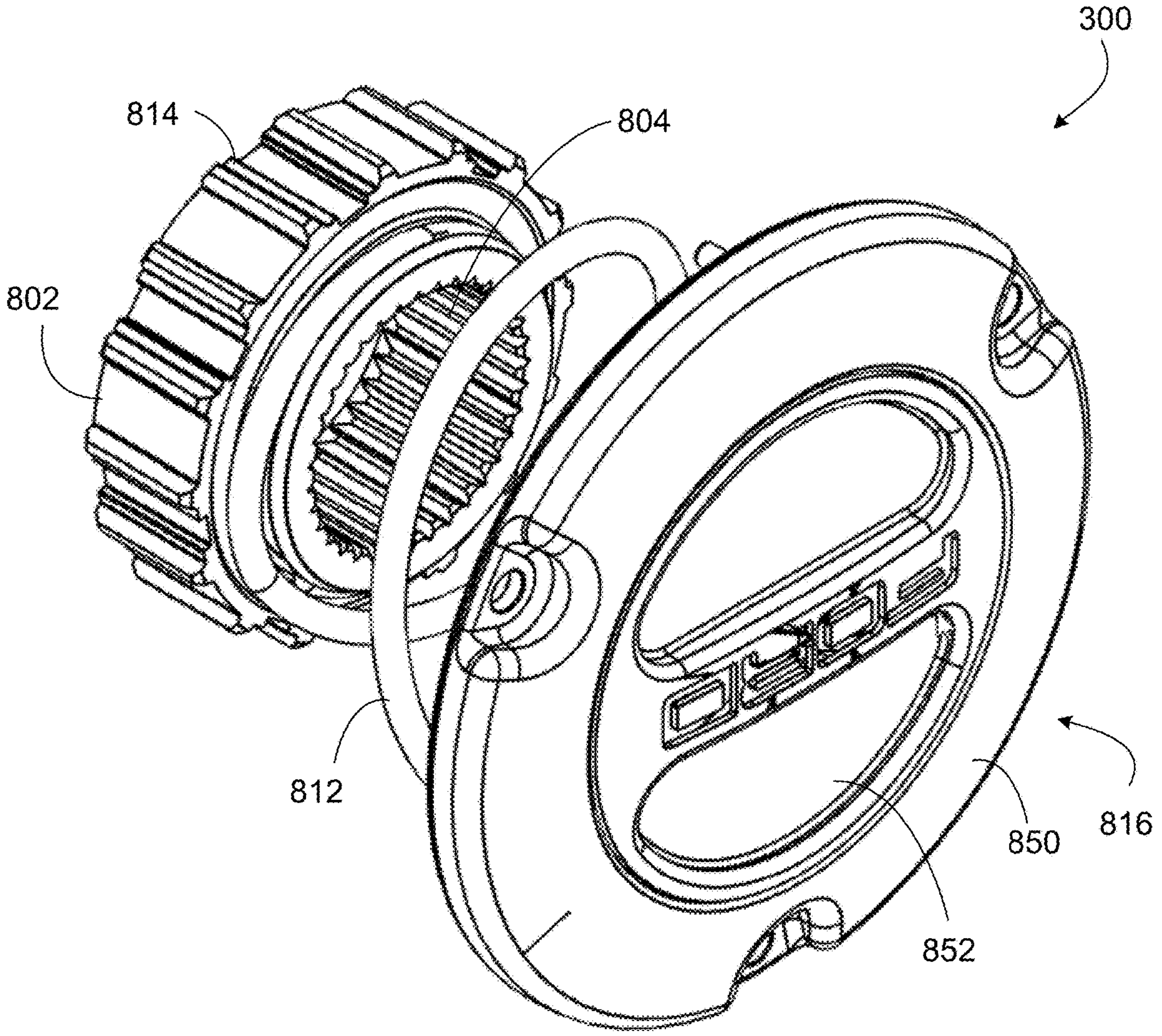
FIG. 8C is a perspective view of the second example hub wheel connecting device.
Figure 8D:
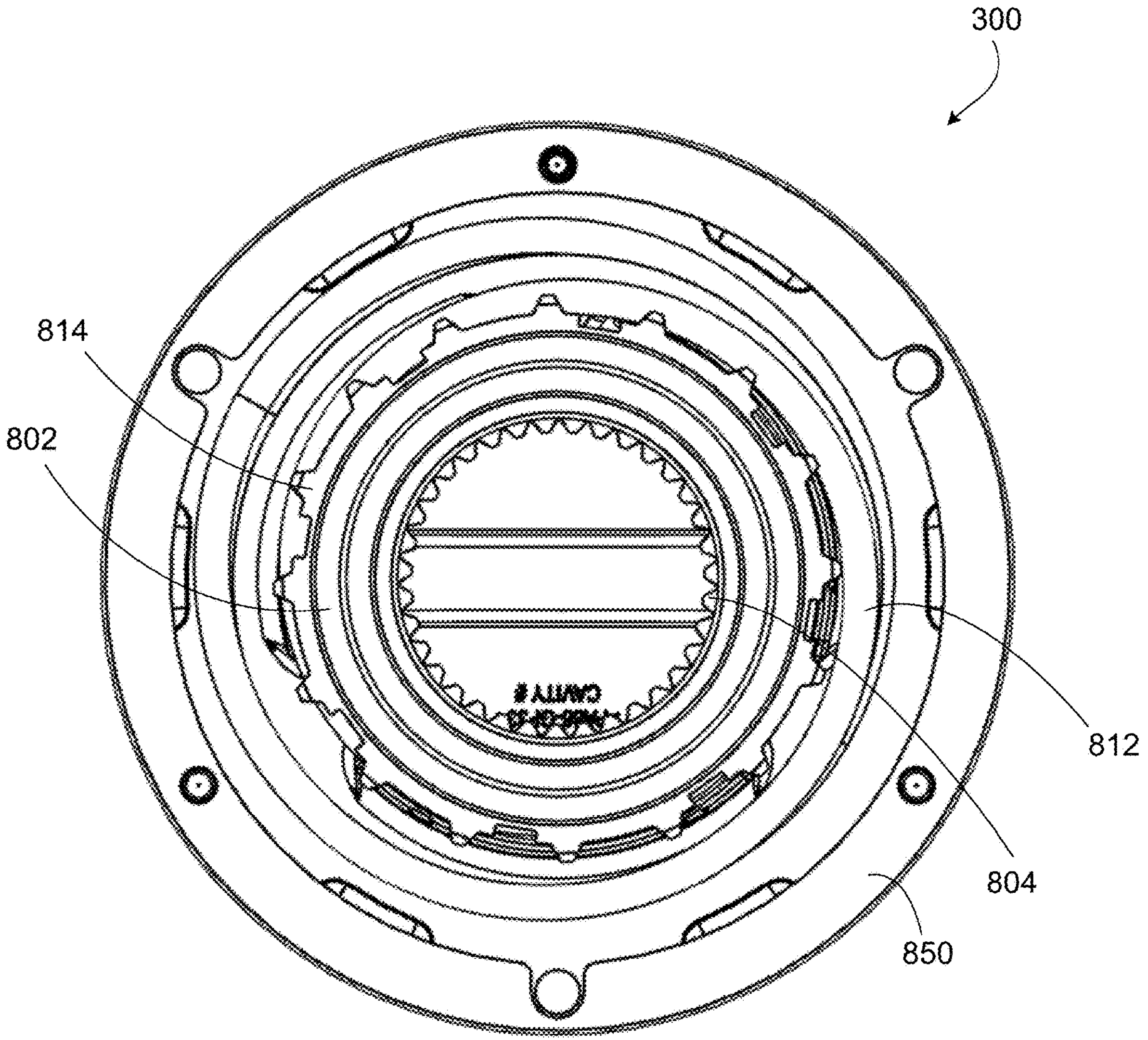
FIG. 8D is a bottom view of the second example hub wheel connecting device.
Figure 8E:
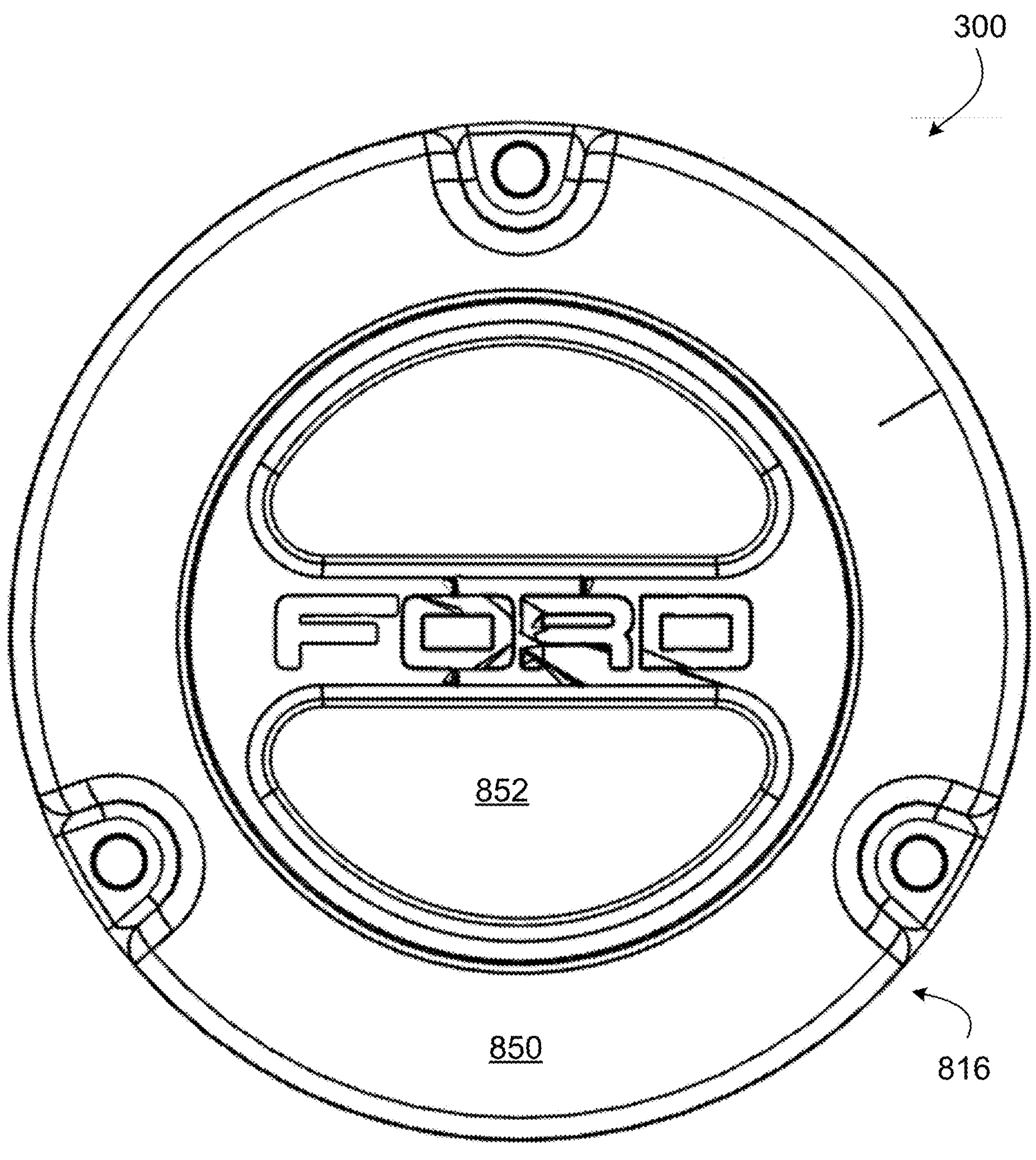
FIG. 8E is a top view of the second example hub wheel connecting device.

FIG. 6 is a block diagram of a controller 100 that can be used with aspects of this disclosure. The controller 100 can, among other things, monitor parameters of the system and send signals to actuate and/or adjust various operating parameters of the system. As shown in FIG. 6, the controller 100, in certain instances, includes a processor 650 (e.g., implemented as one processor or multiple processors) and a memory 652 (e.g., implemented as one memory or multiple memories) containing instructions that cause the processors 650 to perform operations described herein. The processors 650 are coupled to an input/output (I/O) interface 654 for sending and receiving communications with components in the system, including, for example, the hub lock 200. In certain instances, the controller 100 can additionally communicate status with and send actuation and/or control signals to one or more of the various system components (including an actuable system, such as the hub lock 200) of the vehicle 10, as well as other sensors (e.g., pressure sensors, torque sensors, rotational speed and/or position sensors, and other types of sensors) provided with the vehicle 10. In certain instances, the controller 100 can communicate status and send actuation and control signals to one or more of the components within the vehicle 10, such as a heads-up display. The communications can be hard-wired, pneumatic, hydraulic, wireless or a combination. In some implementations, the controller 100 can be a distributed controller with different portions located throughout the vehicle 10. For example, in certain instances, the controller 100 can be the engine control unit, or it can be a separate controller apart from the engine control unit. Additional controllers can be used throughout the vehicle 10 as stand-alone controllers or networked controllers without departing from this disclosure.

The controller 100 can have varying levels of autonomy for controlling the hub lock 200. For example, the controller 100 can begin sensing a vehicle parameter, such as wheel acceleration, and an operator actuates the hub lock 200, by the controller, in response. Alternatively, the controller 100 can begin sensing the vehicle parameter and actuate the hub lock 200 with no input from an operator.

In operation, the vehicle 10 is driven by an axle, such as axle 30 or axle 20. A first wheel is coupled to a first end of the axle, and a second wheel is coupled to a second end of the axle. The first wheel is coupled to the axle to rotate in unison with the axle by a hub connecting device 300. The second wheel can be actuably engaged to be rotably coupled to the second end of the axle, or disengaged from the second end of the axle, by a hub lock 200. Engaging by the hub lock includes axially translating a spline clutch 408 to mate with a drive spline 402.

In some instances, such engagement includes rotating a cap 416 of the hub lock 200. In such instances, the cap includes an interaction side defining a surface to be manipulated by an operator and an operation side defining a ramped portion arranged to axially move the spline clutch responsive to a rotational position of the cap.

In some instances, such engagement includes receiving a pneumatic signal by the hub lock. In such instances, the spline clutch is axially translated to engage with the drive spline by a diaphragm responsive to received pneumatic signal. In some instances, the pneumatic signal can be sent by the controller 100.

In some instances, the second wheel can be disengaged from the axle by the hub lock 200. In such instances, a pneumatic signal is received by the hub lock. In this instance, the spline clutch is axially translated to disengage the drive spline by the diaphragm responsive to a received pneumatic signal.

In some instances, such disengagement can be manually performed by a user outside the vehicle. In such instances, disengaging the second wheel includes rotating a cap of the hub lock 200, for example, by a user.

In some implementations, such procedures and operations can occur on an additional axle. In such implementations, the axle is a first axle, the hub lock is a first hub lock, the spline clutch is a first spline clutch, and the drive spline is a first drive spline. Such implementations can be used, for example, on a four-wheel drive vehicle. In such implementations, the vehicle is driven by a second axle. A third wheel is coupled to a first end of the second axle, and a fourth wheel is coupled to a second end of the second axle. In some implementations, the third wheel is rotably coupled to second end of the second axle on a side of the vehicle opposite the first wheel. In such implementations, the fourth wheel can be actuably engaged to be rotably coupled to the second end of the second axle by a second hub lock 200. The second hub lock 200 is substantially similar to the first hub lock 200 in design and operation as previously described. In some instances, the hub lock 200 in the second wheel and the hub lock 200 in the fourth wheel can be engaged and disengaged simultaneously. In some instances, the first hub lock and the second hub lock can be in opposing states, such as the first hub lock being engaged while the second hub lock being disengaged, or vice versa.

FIG. 7 is a flowchart of an example method 700 that can be used with aspects of this disclosure. As previously described, the axle system includes the drive axle (30 or 20) having a first wheel hub 202 at a first end of the axle and a second wheel hub 202 at a second end of the axle. The first wheel hub 202 and the second wheel hub 202 each define substantially identical profiles (within standard manufacturing tolerances) configured to receive a module. The module includes either the hub connecting device 300 or the hub lock 200. At 702, a first module (200 or 300) is inserted into the first wheel hub 202.

At 704*a*, a second module is inserted into the second wheel hub 202. The second module is different from the first module. For example, in instances where the hub connecting device 300 is used as the first module, the hub lock 200 is used as the second module. Alternatively, in instances where the hub lock 200 is used as the first module, the hub connecting device is used as the second module.

At 704*b*, a second module is inserted into the second wheel hub. The second module is identical to first module. For example, in instances where the hub connecting device 300 is used as the first module, the hub connecting device 300 (that is, a separate but identical hub connecting device 300) is also used as the second module. Alternatively, in instances where the hub lock 200 is used as the first module, the hub lock 200 (that is, a separate but identical hub lock 200) is also used as the second module.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. A wheel hub connecting device comprising:
a drive spline defining an inner profile configured to receive and mate with a drive axle and an outer profile configured to mate with a wheel hub;
a cage surrounding and engaged with the outer profile of the drive spline, the cage retaining the drive spline axially and radially in position relative to the wheel hub connecting device; and
a cap coupled to an end of the wheel hub connecting device opposite the drive spline, the cap enclosing the end of the hub connecting device, wherein the cap comprises:
a ring configured to attach to the wheel hub;
a removable cover surrounded by the ring; and
a gasket between the ring and the removable cover, the removable cover retained to the ring by friction of the gasket.

2. The hub connecting device of claim 1, wherein the cage comprises collets extending axially away from the drive spline, the collets retaining the ring.

3. The wheel hub connecting device of claim 1, wherein the cage is a spring coupling the cap to the drive spline and retaining the drive spline axially and radially in position relative to the outer profile.

4. The wheel hub connecting device of claim 3, wherein a first end of the spring is wound at least partially around an annular groove in the drive spline and a second end of the spring is at least partially wound around an annular groove in the ring.

5. The wheel hub connecting device of claim 3, wherein the spring is the only structural member connecting the cap to the drive spline.

6. The wheel hub connecting device of claim 3, wherein the spring is configured to provide a pre-load centering force.

7. An axle system comprising:
a first drive axle;
a wheel hub connecting device at a first end of the first drive axle, the wheel hub connecting device comprising:
a drive spline defining an inner profile configured to receive and mate with the drive axle and an outer profile configured to mate with a wheel hub;
a cage surrounding and engaged with the outer profile of the drive spline, the cage retaining the drive spline axially and radially;
a cap at an end of the wheel hub connecting device opposite the drive spline; the cap configured to prevent dust from entering the wheel hub connecting device; and
a second drive axle;
a hub lock having substantially similar outer dimensions as the wheel hub connecting device, the hub lock comprising:
a drive spline defining an inner profile configured to receive and mate with the second drive axle and an outer profile;
an axially adjustable spline clutch defining an inner profile configured to mate with the outer profile of the drive spline;
a cage engaged with both the spline clutch and the drive spline to keep the spline clutch and drive spline rotably aligned;
a cap defining:
an interaction side defining a surface to be manipulated by an operator;
an operation side defining a ramped portion arranged to axially move the spline clutch responsive to a rotational position of the cap; and
a diaphragm between the cap and the spline clutch.

8. The axle system of claim 7, wherein the hub lock further comprises a bias set to maintain the spline clutch in a disengaged position.

9. The axle system of claim 7, further comprising a pneumatic linkage fluidically connecting the diaphragm to an actuable pressure source or actuable vacuum source.

10. The axle system of claim 9, further comprising a controller configured to:
direct the actuable pressure source or actuable vacuum source to send an engagement signal to the hub lock.

11. The axle system of claim 9, further comprising a controller configured to:
direct the actuable pressure source or actuable vacuum source to send a disengagement signal to the hub lock.

* * * * *